United States Patent
Dutt et al.

(10) Patent No.: US 12,047,773 B2
(45) Date of Patent: *Jul. 23, 2024

(54) SYSTEM AND METHOD FOR IMPLICIT AUTHENTICATION

(71) Applicant: Zighra Inc., Ottawa (CA)

(72) Inventors: Deepak Chandra Dutt, Ottawa (CA); Anil Buntwal Somayaji, Ottawa (CA); Michael John Kendal Bingham, Ottawa (CA)

(73) Assignee: Zighra Inc., Ottawa (CA)

( * ) Notice: Subject to any disclaimer, the term of this patent is extended or adjusted under 35 U.S.C. 154(b) by 148 days.

This patent is subject to a terminal disclaimer.

(21) Appl. No.: 17/666,363

(22) Filed: Feb. 7, 2022

(65) Prior Publication Data

US 2022/0167163 A1    May 26, 2022

Related U.S. Application Data

(63) Continuation of application No. 16/779,857, filed on Feb. 3, 2020, now Pat. No. 11,272,362, which is a (Continued)

(51) Int. Cl.
*H04W 12/06* (2021.01)
*G06F 1/16* (2006.01)
(Continued)

(52) U.S. Cl.
CPC .......... *H04W 12/06* (2013.01); *G06F 1/1694* (2013.01); *G06F 3/017* (2013.01);
(Continued)

(58) Field of Classification Search
CPC ... H04W 12/06; H04W 12/12; H04W 12/126; H04W 12/68; H04W 12/40;
(Continued)

(56) References Cited

U.S. PATENT DOCUMENTS 5,544,321 A    8/1996  Theimer
6,334,121 B1   12/2001 Primeaux
(Continued)

FOREIGN PATENT DOCUMENTS

GB    2419067        4/2006
WO    WO 2008/041915 4/2008
(Continued)

OTHER PUBLICATIONS

Rodgers, J.L. Thirteen Ways to Look at the Correlation Coefficient Data. The American Statistician, 41(1) 59, doi: 10.2307/2685263 (1998).
(Continued)

*Primary Examiner* — Nimesh Patel
(74) *Attorney, Agent, or Firm* — Mahamedi IP Law LLP

(57) ABSTRACT

A system for implicit authentication for a mobile device associated with a user, wherein the implicit authentication is behavioral, biometric and task-based and includes at least one authentication task selected so as to leverage the user's muscle memory. The mobile device comprises a touchscreen; a transaction authentication information unit; one or more sensors coupled to the transaction authentication information unit; and an anomaly detector coupled to the transaction authentication information unit. The sensors comprise one or more touchscreen sensors coupled to the touchscreen, an accelerometer, and a gyroscope, and are used to obtain and transmit one or more sets of data to the transaction authentication information unit. The sets of data are associated with one or more performances of the authentication task by the user. The anomaly detector generates an authentication model using the one or more data sets transmitted to the transaction authentication information unit.

28 Claims, 4 Drawing Sheets

Related U.S. Application Data continuation of application No. 16/206,491, filed on Nov. 30, 2018, now Pat. No. 10,588,017, which is a continuation of application No. 15/701,916, filed on Sep. 12, 2017, now Pat. No. 10,187,799, which is a continuation-in-part of application No. 14/829,969, filed on Aug. 19, 2015, now Pat. No. 9,788,203.

(60) Provisional application No. 62/039,019, filed on Aug. 19, 2014.

(51) Int. Cl.

| | | |
|---|---|---|
| *G06F 3/01* | (2006.01) | |
| *G06F 3/04883* | (2022.01) | |
| *G06F 21/31* | (2013.01) | |
| *G06F 21/32* | (2013.01) | |
| *H04L 9/40* | (2022.01) | |
| *H04W 12/12* | (2021.01) | |
| *H04W 12/126* | (2021.01) | |
| *G06N 5/01* | (2023.01) | |
| *G06N 20/00* | (2019.01) | |
| *G06N 20/10* | (2019.01) | |
| *H04W 12/68* | (2021.01) | |

(52) U.S. Cl.
CPC ........ *G06F 3/04883* (2013.01); *G06F 21/316* (2013.01); *G06F 21/32* (2013.01); *H04L 63/0861* (2013.01); *H04W 12/12* (2013.01); *H04W 12/126* (2021.01); *G06F 2221/2101* (2013.01); *G06N 5/01* (2023.01); *G06N 20/00* (2019.01); *G06N 20/10* (2019.01); *H04W 12/68* (2021.01)

(58) Field of Classification Search
CPC ... H04W 12/065; H04W 12/04; H04W 12/02; H04W 76/021; H04W 12/08; H04W 4/028; H04W 36/0038; H04W 4/021; H04W 4/22; H04W 72/10; H04W 88/02; H04W 4/029; H04W 4/80; H04W 4/027; H04W 12/63; H04W 4/02; H04W 12/64; H04W 4/38; H04W 12/086; H04W 12/122; H04W 12/33; H04W 4/023; H04W 4/025; H04W 84/042; G06F 1/1694; G06F 3/017; G06F 3/04883; G06F 21/316; G06F 21/32; G06F 2221/2101; G06F 21/31; G06F 3/0488; G06F 21/44; G06F 21/62; G06F 3/011; G06F 18/214; G06F 21/35; G06F 21/60; G06F 21/42; G06F 21/88; G06F 2221/2111; G06F 2009/45587; G06F 2221/2117; G06F 3/013; G06F 11/3438; G06F 16/50; G06F 18/22; G06F 18/24; G06F 21/121; G06F 21/33; G06F 21/6245; G06F 2218/08; G06F 2221/2113; G06F 2221/2133; G06F 2221/2141; G06F 16/285; G06F 18/00; G06F 18/213; G06F 21/34; G06F 21/43; G06F 21/606; G06F 21/6227; G06F 2212/1052; H04L 63/0861; H04L 63/08; H04L 63/062; H04L 63/0892; H04L 2209/80; H04L 63/0823; H04L 63/061; H04L 63/0884; H04L 9/0861; H04L 9/3066; H04L 63/0853; H04L 9/0844; H04L 63/067; H04L 63/0815; H04L 63/065; H04L 63/10; H04L 63/083; H04L 63/107; H04L 9/3231; H04L 63/0428; H04L 9/085; H04L 9/3263; H04L 63/105; H04L 9/0816; H04L 9/0822; H04L 67/535; H04L 67/306; H04L 63/12; G06N 5/01; G06N 20/00; G06N 20/10; G06N 3/08; G06N 3/045; G06N 3/008; G06N 3/04; G06N 5/02; G06N 7/01; G06N 3/047; G06N 5/046; G06N 7/00; G06V 40/172; G06V 40/20; G06V 40/40; G06V 10/82; G06V 20/52; G06V 40/16; G06V 20/64; G06V 40/10; G06V 40/161; G06V 40/168; G06V 40/171; G06V 40/173; G06V 40/18; G06V 10/145; G06V 10/764; G06V 40/12; G06V 40/117; G06V 40/1388; G06V 40/1394; G06V 40/70; G06V 10/7715; G06V 10/761; G06V 10/809; G06V 20/46; G06Q 20/40145; G06Q 20/3276; G06Q 20/4014; G06Q 20/32; H04M 1/72463; H04M 2250/52; H04M 1/72457; H04M 2250/12

See application file for complete search history.

(56) References Cited

U.S. PATENT DOCUMENTS

| | | | |
|---|---|---|---|
| 6,542,729 | B1 | 4/2003 | Chmaytelli |
| 6,810,480 | B1 | 10/2004 | Parker |
| 7,081,905 | B1 | 7/2006 | Raghunath |
| 7,155,417 | B1 | 12/2006 | Sagar |
| 7,162,741 | B2 | 1/2007 | Eskin |
| 7,391,326 | B2 | 6/2008 | Puzio |
| 7,689,524 | B2 | 3/2010 | Ozzie |
| 7,739,951 | B2 | 6/2010 | Stab |
| 7,979,899 | B2 | 7/2011 | Guo |
| 8,020,005 | B2 | 9/2011 | Mani |
| 8,065,277 | B1 | 11/2011 | Gardner |
| 8,145,561 | B1 | 3/2012 | Zhu |
| 8,321,360 | B2 | 11/2012 | Lanxner |
| 8,355,987 | B2 | 1/2013 | Hirson |
| 8,359,278 | B2 | 1/2013 | Domenikos |
| 8,577,803 | B2 | 11/2013 | Chatterjee |
| 8,816,818 | B2 | 8/2014 | Yamada |
| 8,863,307 | B2 | 10/2014 | Sorek |
| 9,066,125 | B2 | 6/2015 | Sands |
| 9,117,068 | B1 | 8/2015 | Zhang |
| 9,264,419 | B1 | 2/2016 | Johansson |
| 9,294,465 | B2 | 3/2016 | Gandhi |
| 9,367,676 | B2 | 6/2016 | Wilson |
| 9,386,507 | B1 | 7/2016 | Ramalingham |
| 9,396,316 | B1 | 7/2016 | Altman |
| 9,471,920 | B2 | 10/2016 | Kolkowitz |
| 9,727,713 | B2 | 8/2017 | Agawa |
| 9,788,203 | B2 * | 10/2017 | Dutt ............... H04W 12/06 |
| 9,871,813 | B2 | 1/2018 | Andreeva |
| 10,187,799 | B2 * | 1/2019 | Dutt ............... H04W 12/065 |
| 10,262,324 | B2 | 4/2019 | Turgeman |
| 10,298,614 | B2 | 5/2019 | Turgeman |
| 10,306,052 | B1 | 5/2019 | Lack |
| 10,404,729 | B2 | 9/2019 | Turgeman |
| 10,588,017 | B2 * | 3/2020 | Dutt ............... H04W 12/06 |
| 10,621,585 | B2 | 4/2020 | Turgeman |
| 10,685,355 | B2 | 6/2020 | Novick |
| 10,747,305 | B2 | 8/2020 | Turgeman |
| 10,834,590 | B2 | 11/2020 | Turgeman |
| 10,949,514 | B2 | 3/2021 | Turgeman |
| 10,949,757 | B2 | 3/2021 | Turgeman |
| 11,223,619 | B2 | 1/2022 | Turgeman |
| 11,269,977 | B2 | 3/2022 | Turgeman |
| 11,272,362 | B2 * | 3/2022 | Dutt ............... G06F 1/1694 |
| 2002/0184080 | A1 | 12/2002 | Murad |
| 2003/0110393 | A1 | 6/2003 | Brock |
| 2005/0166065 | A1 | 7/2005 | Eytchison |
| 2006/0223495 | A1 | 10/2006 | Cassett |
| 2006/0224898 | A1 | 10/2006 | Ahmed |
| 2006/0282660 | A1 | 12/2006 | Varghese |

(56) References Cited

U.S. PATENT DOCUMENTS

| | | |
|---|---|---|
| 2007/0061590 A1 | 3/2007 | Boye |
| 2007/0219801 A1* | 9/2007 | Sundaram ............... G10L 17/04 |
| | | 704/270 |
| 2008/0020733 A1 | 1/2008 | Wassingbo |
| 2008/0036591 A1 | 2/2008 | Ray |
| 2008/0092245 A1 | 4/2008 | Alward |
| 2008/0113650 A1 | 5/2008 | Engstrom |
| 2008/0220854 A1 | 9/2008 | Midgley |
| 2009/0254572 A1 | 10/2009 | Redlich et al. |
| 2009/0293111 A1 | 11/2009 | Lai |
| 2009/0313693 A1 | 12/2009 | Rogers |
| 2009/0327132 A1 | 12/2009 | Diev |
| 2010/0004997 A1 | 1/2010 | Mehta |
| 2010/0010907 A1 | 1/2010 | Dasgupta |
| 2010/0057623 A1 | 3/2010 | Kapur |
| 2010/0100439 A1 | 4/2010 | Jutla |
| 2010/0107238 A1 | 4/2010 | Stedman |
| 2010/0115610 A1 | 5/2010 | Tredoux |
| 2010/0192209 A1 | 7/2010 | Steeves |
| 2010/0248706 A1 | 9/2010 | Potkonjak |
| 2011/0016534 A1 | 1/2011 | Jakobsson |
| 2011/0148633 A1 | 6/2011 | Kohlenberg et al. |
| 2011/0202461 A1 | 8/2011 | Lundgren |
| 2011/0209159 A1 | 8/2011 | Baratz et al. |
| 2011/0225644 A1 | 9/2011 | Pullikottil |
| 2012/0149449 A1 | 6/2012 | Choi |
| 2012/0196568 A1 | 8/2012 | Baksil |
| 2012/0203663 A1 | 8/2012 | Sinclair |
| 2012/0233658 A1 | 9/2012 | Piersol |
| 2012/0235938 A1* | 9/2012 | Laubach ............. G06F 3/04883 |
| | | 345/173 |
| 2012/0239479 A1 | 9/2012 | Amaro |
| 2012/0253957 A1 | 10/2012 | Bakshi |
| 2012/0278094 A1 | 11/2012 | Kovacevic |
| 2012/0300938 A1 | 11/2012 | Kean |
| 2012/0323717 A1 | 12/2012 | Kirsch |
| 2013/0030875 A1 | 1/2013 | Lee |
| 2013/0042327 A1 | 2/2013 | Chow |
| 2013/0061285 A1 | 3/2013 | Donfried et al. |
| 2013/0073463 A1 | 3/2013 | Dimmick |
| 2013/0081119 A1 | 3/2013 | Sampas |
| 2013/0097683 A1 | 4/2013 | Davis |
| 2013/0102283 A1* | 4/2013 | Lau .................... G06Q 30/0269 |
| | | 455/411 |
| 2013/0104187 A1 | 4/2013 | Weidner |
| 2013/0110658 A1 | 5/2013 | Lyman |
| 2013/0133033 A1 | 5/2013 | Davis |
| 2013/0160087 A1 | 6/2013 | Davis |
| 2013/0181949 A1 | 7/2013 | Setlak |
| 2013/0191908 A1 | 7/2013 | Klein |
| 2013/0205387 A1 | 8/2013 | Le et al. |
| 2013/0227651 A1 | 8/2013 | Schultz |
| 2013/0232159 A1 | 9/2013 | Daya |
| 2013/0239206 A1 | 9/2013 | Draluk |
| 2013/0257804 A1* | 10/2013 | Vu ....................... G06F 3/04162 |
| | | 345/174 |
| 2013/0275355 A1 | 10/2013 | Miltonberger |
| 2013/0276118 A1 | 10/2013 | Kashyap |
| 2013/0344859 A1* | 12/2013 | Abramson ...... H04M 1/724098 |
| | | 455/418 |
| 2013/0347066 A1 | 12/2013 | Wells |
| 2014/0068778 A1 | 3/2014 | Bhatia |
| 2014/0092052 A1 | 4/2014 | Grunthaner |
| 2014/0201120 A1 | 7/2014 | Lydon |
| 2014/0289867 A1 | 9/2014 | Bukai |
| 2014/0037243 A1 | 11/2014 | Dutt |
| 2014/0337243 A1* | 11/2014 | Dutt .................... G06Q 20/327 |
| | | 705/325 |
| 2014/0337945 A1 | 11/2014 | Jia et al. |
| 2016/0259924 A1* | 9/2016 | Dutt .................... H04L 63/1425 |
| 2017/0163471 A1 | 6/2017 | Zheng |
| 2023/0410116 A1 | 12/2023 | Dutt |

FOREIGN PATENT DOCUMENTS

| | | |
|---|---|---|
| WO | WO 2011/006381 | 6/2011 |
| WO | WO 2013/155628 | 10/2013 |

OTHER PUBLICATIONS

ISR and Written Opinion in PCT/IB2014/063959 dated Dec. 8, 2014.

Wang, Analysis of human electrocardiogram for biometric recognition, EURASIP Journal on Advances in Signal Processing, 2008:19, 2008.

Behavio Gesture Lock https:// play.google.com/store/apps/details/ Aug. 19, 2013.

Li, Yiru "Securing email archives through user modeling", Computer Security Applications Conference, 21st Annual, IEEE, 2005.

Li, Yiru, "Toward Email Archive Intrusion Detection", Master of Computer Science dissertation, Carleton University, 2005.

Thorpe, Pass-thoughts: authenticating with our minds, Proceedings of the 2005 workshop of new security paradigms (NSPW '05), ACM, New York 2005.

Zakaria, Shoulder surfing defence for recall-based graphical passwords, Proceedings of the Seventh Symposium on Unsable Privacy and Security, p. 6, ACM, 2011.

Furnell, Beyond the PIN: Enhancing user authentication for mobile devices, Computer Fraud & Security, Aug. 2008, pp. 12-17, vol. 2008, Issue 8, Elsevier, Plymouth, UK.

Furnell, Authentication of users on mobile telephones—A survey of attitudes and practices, Computers & Security, Oct. 2005, pp. 519-527, vol. 24, Issue 7, Elsevier, Perth, Australia.

Feng, Continuous mobile authentication using touchscreen gestures, Homeland Security (HST), 2012 IEEE, Conference on Technologies, Nov. 2012, pp. 451-456, IEEE.

Frank, Touchalytics: On the Applicability of Touchscreen Input as a Behavioral Biometric for Continuous Authentication, Jan. 2013, pp. 136.

Lin, A New Non-Intrusive Authentication Method based on the orientation sensor for Smartphone users, IEEE Sixth International Conference oon Software Security and Reliability (SERE), Aug. 2012, pp. 245-252, IEEE.

Derawi, Unobtrusive User Authentication on Mobile Phones Using Biometric Gait Recognition, Intelligent Information Hiding and Multimedia Signal Processing (IIH-MSP), 2010 Sixth International Conference, Oct. 2010, IEEE.

Palaniappan, Biometrics from Brain Electrical Activity: A machine learning Approach, IEEE Transaction on Pattern Analysis and Machine Intelligence, Apr. 2007, pp. 738-742, vol. 29, No. 4, IEEE Computer Society.

Monrose, Keystroke dynamics as a biometric for authentication, Future Generation Computer Systems, Feb. 2000, pp. 351-359, vol. 16, Issue 4, Elsevier, New York, NY, USA.

Zhao, Face recognition: A literature survey, Computing Surveys (CSUR), Dec. 2003, pp. 399-458, vol. 35 Issue 4, ACM, New York, NY, USA.

Plamondon, Online and off-line handwriting recognition: a comprehensive survey, Pattern Analysis and Machine Intelligence, Jan. 2000, pp. 63-84, vol. 22, Issue: 1, IEEE.

Jakobsson, Implicit Authentication for Mobile Devices, Proceedings of the 4th USENIX conference on Hot topics in security, 2009, pp. 9-9, USENIX Association.

Shi, Implicit Authentication through Learning User 15 Behavior, Information Security, 2011, pp. 99-113, vol. 6531, Springer.

Riva, Progressive Authentication Deciding When to Authenticate on Mobile Phones, 21st USENIX Security Symposium, 2012, USENIX.

Shi, W., Sengard: Passive user identification on smartphones using multiple sensors, 2011 IEEE 7th International Conference on Wireless and Mobile Computing, Networking and Communications (WiMob), 2011, pp. 141-148, IEEE.

Bo, SilentSense: silent user identification via touch and movement behavioral biometrics, 19th annual international conference on Mobile computing & networking, 2013, pp. 187-190, ACM, New York, NY, USA.

(56) References Cited

OTHER PUBLICATIONS

Clarke, Authenticating mobile phone users using keystroke analysis, International Journal of Information Security, Jan. 2007, pp. 1-14, vol. 6, Issue 1, Springer.

Li, Securing email archives through user modeling, Computer Security Applications Conference, 21 Annual, 2005, IEEE.

Li, Toward Email Archive Intrusion Detection, 2005, Master of Computer Science dissertation, Carleton University.

White-paper—BehavioMobile: Applying the behaviosec technology for multilayered mobile security, retrieved from http://behaviosec.com/ wp-content/uploads/2012/10/ whitepaper-behaviomobile.pdf, 2012, BehavioSec.

Hirishima, SkipLock, retrieved from http://benhirashima.com/skiplock/, Dec. 7, 2016 www.benhirashima.com.

Rice, Android Jelly Bean's Face Unlock "Liveness Check" Circumvented With Simple Photo Editing, retrieved from http://www.androidpolice.com/2012/08/03/android-jelly-beans-face-unlock-liveness-check-circumvented-with-simple-photo-editing/, Android Police.

Etherington, Apple Patents IR Tech For Detecting The Force Of Touch Input On iPads And iPhones, https://techcrunch.com/2014/04/03/apple-patents-ir-tech-for-detecting-the-force-of-touch-input-on-ipads-and-iphones/ retrieved on Dec. 7, 2016, TechCrunch.

White paper: Third Party Verification of Eyeprint Accuracy, Eyeverify, www.eyeverify.com, Apr. 2013, EyeVerify.

Android 4.0 (Ice Cream Sandwich), www.android.com, Jun. 2014, Android.

Behavio Gesture Lock User Guide dated Sep. 7, 2011, pp. 1-11, BehavioMetrics AB.

Behavio Gesture Lock 3.O.8., 2012, http://learn-the-figures.android.informer.com/3.0.8/, 2012.

Samsung Galaxy S-5, Capturing Lifetime Moments, www.samsung.com, Jun. 2014, Samsung.

\* cited by examiner

SYSTEM AND METHOD FOR IMPLICIT AUTHENTICATION

CROSS-REFERENCE TO RELATED APPLICATIONS

This application is a continuation of U.S. patent application Ser. No. 16/779,857 filed Feb. 3, 2020, which is a continuation of U.S. patent application Ser. No. 16/206,491, filed Nov. 30, 2018, which is a continuation of U.S. patent application Ser. No. 15/701,916, filed Sep. 12, 2017, now allowed as U.S. Pat. No. 10,187,799, which is a continuation-in part of U.S. patent application Ser. No. 14/829,969, filed Aug. 19, 2015, now allowed as U.S. Pat. No. 9,788,203, which claims the benefit of U.S. Provisional Application No. 62/039,019, filed Aug. 19, 2014, all of which are hereby incorporated by reference herein in their entireties.

FIELD OF THE INVENTION

The present disclosure relates to implicit authentication systems for mobile devices.

BACKGROUND OF THE INVENTION

Mobile devices such as smartphones, tablets and including wearable computing devices such as Google® Glass are vulnerable to being used by unauthorized individuals or impostors all the time. Whether it is a thief who steals it from a purse on a subway, a romantic partner checking text messages for signs of an affair, or a child looking to play games, mobile device users run serious risks when unauthorized users or impostors obtain access to such devices.

Various prior art and prior use mechanisms are utilized in mobile devices to protect against use by unauthorized individuals or impostors. For example, all smartphones have lock screens that are protected by a variety of mechanisms including PINs, passwords, gestures, and fingerprints. While lock screens can provide significant protections when properly used, they can also degrade the usability of a device by inserting an unwanted step, the authentication step, between the user and their objective of using their phone at all times of the day and night. The burden is so significant that many users forego the protection of lock screens, as explained in "Beyond the pin: Enhancing user authentication for mobile devices" by S. Furnell, N. Clarke, and S. Karatzouni, Computer fraud & security, 2008(8):12-17, 2008; and "Authentication of users on mobile telephones—a survey of attitudes and practices" by N. L. Clarke and S. M. Furnell, Computers & Security, 24(7):519-527, 2005.

Even when users do enable these mechanisms, users may configure these mechanisms using weak credentials or so the device locks itself infrequently. Further, the protection provided is also incomplete, as some unauthorized users or impostors will know how to bypass the lock screen.

Implicit authentication mechanisms provide a solution to overcome these problems by allowing the mobile device to identify the user without the user doing any explicit authentication actions. Several researchers have proposed implicit authentication schemes for smartphones based upon how users interact with a touchscreen. Examples include the systems described in "Continuous mobile authentication using touchscreen gestures" by Feng et al, 2012 IEEE Conference on Technologies for Homeland Security (HST), pp. 451-456, 2012; and "Touchalytics: On the applicability of touchscreen input as a behavioral biometric for continuous authentication" by Frank et al, IEEE Transactions on Information Forensics and Security, vol. 8, no. 1, pp. 136-148, 2013. Systems such as the one described in "Behaviomobile: Applying the behaviosec technology for multilayered mobile security".

Other schemes have been proposed based on how users hold the phone, such as the system described in "A new non-intrusive authentication method based on the orientation sensor for smartphone users" by C.-C. Lin, D. Liang, C.-C. Chang, and C.-H. Yang in 2012 IEEE Sixth International Conference on Software Security and Reliability (SERE), pages 245-252. IEEE 2012.

Other schemes have been proposed based on gait, such as the system described in Derawi, Mohammad Omar, et al. "Unobtrusive user-authentication on mobile phones using biometric gait recognition." Intelligent Information Hiding and Multimedia Signal Processing (IIH-MSP), 2010 Sixth International Conference on. IEEE, 2010.

To date, however, commercially available prior art and prior use systems have offered only improved security guarantees, such as by ensuring the correct person is entering a PIN or password pattern, rather than the improved usability of a non-intrusive authentication system.

While results from these prior art systems show that it is possible to distinguish users using mobile device sensors and machine learning algorithms, these prior art systems do not use appropriate algorithms or the appropriate evaluation methodologies that are required for building and assessing a workable implicit authentication scheme.

There are several requirements for practical mobile device implicit authentication mechanisms, which will be discussed in the section titled "Requirements" below.

A swipe-based implicit authentication scheme that addresses the requirements is then set out in the section titled "Approach".

Prior Art Approaches to Mobile Authentication

FIG. 1 illustrates a typical configuration for a mobile device. A mobile device such as mobile device 101 is coupled to network 102 using at least one communication technique known to those of skill in the art. Examples of communication techniques include Wi-Fi, LTE, 2G and 3G. A fraud reporting center 103 and an authentication server 104 are also coupled to the mobile device 101 via a network 102 that is implemented using one or more networking technologies known to those of skill in the art. Examples of these networking technologies include wired networks, wireless networks, optical networks, Local Area Networks (LAN), Campus Area Networks (CAN) and Metropolitan Area Networks (MAN). In some embodiments, network 102 is comprised of a plurality of networks and subnetworks.

Following the example of lock screens in desktop-oriented operating systems, mobile devices all include, at the very least, a text-based authentication option. Several factors specific to mobile devices make text-based authentication less usable and secure than on desktop or notebook computers. For example, modern smartphones primarily employ touch-based on-screen keyboards that require switching between multiple screens in order to access infrequently used characters and use text prediction to improve typing accuracy. Good passwords, however, are long strings of characters that cannot be easily predicted and include multiple infrequently used characters. Secure passwords are thus hard to enter on smartphones.

PINs are simpler to enter due to the larger, and fewer, buttons that are needed, and their shorter length. However, they are still not as easy to enter as on a physical keyboard.

Furthermore, they are particularly easy for an attacker or impostor to observe, given their simplistic nature, by "shoulder surfing" or taking a video of a person typing in their PIN. Shoulder surfing is a significant problem as mobile devices are heavily used in public environments, places where an attacker/impostor can more easily observe PIN entry and steal a device.

A number of different approaches have been proposed to reduce the usability strain of text-based authentication mechanisms on mobile devices while maintaining high security. One popular alternative is a swipe pattern unlock screen, such as the standard Android pattern unlock interface. In the Android implementation, the password is an ordered series of connected points which the user connects by dragging their finger on the screen. While this is a usability improvement over text entry, the approach is still vulnerable to shoulder surfing by impostors, smudge attacks by impostors, as well as random guessing of common patterns.

Other solutions such as "SkipLock" created by B. Hirashima have focused on avoiding the use of authentication mechanisms by establishing trusted areas where the identity of the user can be established with high probability based on their location. For example, a user may configure their device to never ask for a password when it is within their home, which may be established by GPS coordinates, or when it is near a trusted computer, which could be determined via Bluetooth. Though this approach does increase usability by bypassing authentication in tightly bounded scenarios, it does nothing to increase either the usability or the security of authentication in public settings. Furthermore, it also does not help with the numerous non-traditional impostor attacks mobile devices are subject to, for example, a child playing a game on a parent's work phone or tablet.

Moving away from the traditional approaches to authentication described above, biometrics have become an increasingly popular mobile authentication mechanism, especially in the past year with the introduction of fingerprint identification to Apple® iOS® Security and more recently Samsung smartphones.

Many biometric approaches use static biometrics, in that they are based upon one or more characteristics of the human body that remains stable over time. For example, fingerprint scanners; facial recognition systems and eye scan-based authentication mechanisms such as that described in "EyeVerify. White Paper: Third-Party Verification of Eyeprint Accuracy," April 2013 are all commercially available for smartphones. Static biometrics generally have high true positive rates (authorized users can easily unlock the device) and high true negative rates (unauthorized users are rejected).

There are two fundamental limitations of static biometrics, however. The first is that static biometric approaches require that the user take explicit action to authenticate themselves by exposing some part of their anatomy to a sensor. Such an explicit action will, in general, be a distraction from the user's primary task, and as such frequent authentication checks will be unacceptable to most users. The second is that static biometrics can often be mimicked by impostors using relatively simple techniques known to those of skill in the art, for example, a picture of a person's face to fool a facial recognition sensor; or a latex finger to subvert a fingerprint scanner. This mimicry is fundamentally hard to stop because the primary sensor used is, essentially, a camera, and there are many ways of fooling cameras, and there are many ways of obtaining a copy of the original person's biometric data, for example, gathering fingerprints left elsewhere on a device.

Furthermore, some static biometrics may persist even when the user has either been killed or seriously injured by an impostor, such as, for example, retina scans and fingerprint authentication. Liveness detection, such as checking for blinking in an image while doing facial recognition, are, in practice, insignificant barriers to attackers because these sensors can also be defeated using means known to those of skill in the art.

While mimicry attacks against static biometrics is a concern, of greater concern are the extra steps required for authentication using static biometrics. Explicit authentication actions, no matter how simple, introduce friction that users will want to minimize, if not eliminate. A trade-off for lower security is often perceived as being worth the cost, at least until a device is compromised.

Behavioral Biometrics

Biometrics in general distinguish users based upon invariants in "who they are." As previously discussed, static biometrics are based upon invariants in physical characteristics. Dynamic biometrics, or more commonly behavioral biometrics, are based upon invariants in an individual's behavior. Generally, this behavior is consistent because of subconscious factors affecting how human bodies operate. While some schemes are based upon characteristics that are primarily involuntary, such as:

Heartbeats, as described in "Analysis of human electrocardiogram for biometric recognition" by Y. Wang, F. Agrafioti, D. Hatzinakos, and K. N. Plataniotis in EURASIP journal on Advances in Signal Processing, 2008:19, 2008; and Neural signals and other brain activity recorded in response to a specific visual or auditory stimulus using a system such as the ones described in "Pass-thoughts: authenticating with our minds" by J. Thorpe, P. C. van Oorschot, and Anil Somayaji in Proceedings of the 2005 workshop on New security paradigms (NSPW '05). ACM, New York, NY; and "Biometrics from brain electrical activity: a machine learning approach" by R. Palaniappan and D. P. Mandic in Pattern Analysis and Machine Intelligence, IEEE Transactions on, 29(4): 738-742, 2007.

Most are based upon behavior that is under more conscious control.

Behavioral biometrics can be grouped into three categories: continuous, secondary and task-based. With a continuous behavioral biometric, the behavior of the user is continually observed and modeled, with the system detecting abnormal usage patterns associated with unauthorized use on an ongoing basis. With secondary biometrics, user behavior is monitored only while performing a standard authentication task, such as a PIN entry. A task-based biometric is similar in spirit to a secondary biometric, except that any task can be observed and modeled, not just an explicit authentication task.

Behavioral biometrics are, in general, more challenging to develop and deploy than static biometrics because human behavior is fundamentally variable. Despite this, the accuracy can be comparable to that of static biometrics-based systems because behavioral biometrics can take advantage of many more observations than static biometrics, and can do so in ways that require no additional work from the user.

Behavioral biometrics have a long history, including, for example,

Keyboard typing patterns such as the system described in "Keystroke dynamics as a biometric for authentication" by F. Monrose and A. D. Rubin in Future Generation computer systems, 16(4):351-359, 2000;

Facial recognition such as the system described in "Face recognition: A literature survey" by W. Zhao, R. Chellappa, P. J. Phillips, and A. Rosenfeld in ACM Computing Surveys (CSUR), 35(4):399-458, 2003; and Handwriting recognition such as the system described in "Online and off-line handwriting recognition: a comprehensive survey" by R. Plamondon and S. N. Srihari in Pattern Analysis and Machine Intelligence, IEEE Transactions on, 22(1):63-84, 2000.

However there is a need to focus on behavioral biometrics that are easily observed during the course of normal smartphone usage, specifically behavioral biometrics that utilize three key smartphone sensors: the touchscreen, the accelerometer and the gyroscope.

Requirements

In this section, five key requirements seen as being essential to a secure and usable implicit authentication solution are detailed.

(1) Learn only on user data: While it is possible to get samples of simulated malicious behavior in a lab setting, a deployed behavioral biometric system will not have access to representative malicious behavior. It also won't have access to a representative set of other user behavior, except perhaps for offline tuning purposes. Thus, a behavioral biometric should construct its model of a user's behavior based primarily (if not exclusively) on observations of that user. In machine learning terms, anomaly detection algorithms or one-class learning algorithms must be used. Many commonly used machine learning algorithms are two or multi-class learning algorithms and therefore do not meet this requirement.

(2) Model stable observables: Within the framework of anomaly detection, it is easier to learn normal behavior if the space of possible behaviors is small. In the context of smartphones this requirement is challenging as smartphone sensors may produce a deluge of data. Further, the output of these sensors can be highly variable: for example, they vary widely depending upon the task the user is performing: navigation while driving, a tilt-controlled game, or email. In machine learning, the "curse of dimensionality" says that as the complexity of data increases, the more data is required in order to learn a model. For implicit authentication quick learning of models of user behavior and quick detection of anomalies are important. Effective implicit authentication systems, then, will filter or process their data such that they detect anomalies in "stable observables"—characteristics of the data which remain invariant, unique and act predictably over time. This points to a disadvantage of continuous behavioral biometrics, as these systems will have less stable observables than secondary and task-based ones, simply because continuous gathering of user behavior will inevitably mean the system will be observing the user is highly variable contexts. Therefore, known consistent phenomena which will generally produce consistent data for modeling purposes should be used.

(3) Employ lightweight, online learning algorithms: User behavior is expected to naturally change over time. Anomaly detection algorithms thus must run online so that they can constantly learn from newly observed behavior. This incremental online learning must also be computationally lightweight as it should not impose significant latency upon the user interface—the user should not have to wait for the device to decide whether an action is going to be allowed or not. Lightweight learning methods are made feasible by stable observables: the easier the learning problem, the simpler the method that can achieve good results.

(4) Be resistant to mimicry attacks: Mobile devices such as smartphones are often used in public places, where they may be lost or stolen. This means that mobile devices must consider an attack scenario not commonly considered in other authentication contexts, that is where an attacker or impostor is able to physically observe the authentication taking place. For this reason it is important for implicit authentication schemes to be resistant to mimicry, or imitation, attacks. A typical "something you know" authentication scheme, such as a pin or password, performs poorly on this metric, since the attacker/impostor observes the credential being inputted and is able to replicate it perfectly. Though shoulder surfing resistant mitigation techniques exist such as those described in "Shoulder surfing defence for recall-based graphical passwords" by N. H. Zakaria, D. Griffiths, S. Brostoff, and J. Yan in Proceedings of the Seventh Symposium on Usable Privacy and Security, page 6. ACM, 2011; these mitigation techniques typically gain this increase in security by compromising usability.

(5) Authentication should be non-intrusive: Security is almost always a secondary task for users. This means that it distracts from the main activity the user wants to accomplish, for example checking their email or responding to a text message. This is particularly true of authentication, which inserts itself directly between the user and the task they want to accomplish. One way to make authentication usable is to ensure it is non-intrusive—meaning that it is transparent to the user. An example of a transparent authentication system in a non-mobile context are SSH public keys. Rather than prompting the user to enter an explicit password when connecting to an SSH server, the system uses public key cryptography to automatically establish the user's identity. In a mobile context, an explicit authentication task such as entering a PIN or password is intrusive, hence the frequency of authentication requests must be minimized, for example, only performed when the device is woken up from sleep after 5 minutes of inactivity. Because secondary biometrics require explicit authentication actions such as PIN entry, these are considered to be relatively intrusive. In contrast, continuous and task-based behavioral biometrics tend to be non-intrusive.

Prior Art Behavioral Biometric Systems

Early works of prior art in behavioral biometrics-based implicit authentication in a mobile context are the systems described in:

"Implicit authentication for mobile devices" by M. Jakobsson, E. Shi, P. Golle, and R. Chow in Proceedings of the 4th USENIX conference on Hot topics in security, pages 9-9, USENIX Association, 2009; and "Implicit authentication through learning user behavior" by E. Shi, Y. Niu, M. Jakobsson, and R. Chow in Information Security, pages 99{113. Springer, 2011.

In these works, systems based on implicit authentication via observation of user behavior are described. These works model user behavior as the probability of seeing a particular event, such as a phone call to a certain number, conditioned on the time of day. This model is used to calculate an authentication score, which triggers a security event if the score drops below a threshold. The modeling is built only on observation of user data, which satisfies the first requirement above. However, since this is a continuous system, the space of user behavior is large and may not be stable. Additionally, since attack scenarios are tested by splicing data from other users into one user's data stream; thus they only test whether users can be distinguished, not whether they can imitate each other. Therefore it is unclear whether such a system is resistant to mimicry attacks by impostors.

In the system described in "Progressive authentication: deciding when to authenticate on mobile phones" by O. Riva, C. Qin, K. Strauss, and D. Lymberopoulos in Proceedings of the 21st USENIX Security Symposium, 2012, the motivation is to reduce the number of times a user is asked to authenticate. This is done by combining a number of sensors to establish a confidence that the device is in the possession of the correct user. For example, the microphone can be leveraged to do voice recognition, Bluetooth can be used to establish if the phone is near another trusted device, the camera is available for facial recognition, and more. Some of these tasks constitute stable observable tasks according to the second requirement. However, training some sensors, such as facial or voice recognition, is an inefficient and obtrusive task. Additionally, the system divides access to content on the device into three different security levels. More confidential content requires a higher confidence to access without explicit authentication than less confidential content. The system uses support vector machines (SVM) and decision tree models which train on multiple classes of user data, thus they do not meet our first requirement. Though the evaluation does include attack scenarios, the scenarios do not include scenarios concerning imitation by impostors. Therefore, it is unclear whether such a system is resistant to mimicry attacks.

Other work which continues along the same lines is the system described in "Senguard: Passive user identification on smartphones using multiple sensors" by W. Shi, J. Yang, Y. Jiang, F. Yang, and Y. Xiong in Wireless and Mobile Computing, Networking and Communications (WiMob), 2011 IEEE 7th International Conference on, pages 141-148. IEEE, 2011, which aims to incorporate touch gesture recognition along with voice, gait and location information to identify users in a continuous way. The system uses one-to-many binary classifiers, which do not train only on user data and therefore does not meet the first requirement. These classifiers also cannot be updated continuously, which impacts their ability to learn efficiently. Since observation seems to be occurring at all times, it is difficult for the system to achieve stable observation. However, the system does not consider imitation attacks by impostors, so therefore it is unclear whether such a system is resistant to mimicry attacks.

While the previously mentioned work performs continuous authentication by fusing data from multiple sensors together to make an authentication decision, other systems take a narrower focus. The system described in "Continuous mobile authentication using touchscreen gestures" by Feng et al in IEEE Conference on Technologies for Homeland Security (HST), pp. 451-456, 2012 uses touch information from the user performing common gestures combined with data from a sensor glove the user wears to discriminate between users. This system relies on classification algorithms such as decision trees and random forests, which do not train solely on a single class of user data. The evaluation does not include an analysis of imitation attacks by impostors, therefore it is unclear whether such a system is resistant to mimicry attacks. Furthermore, the best results were obtained using information from a specialized glove worn by the user to collect additional data, which appears intrusive.

The system described in "A new non-intrusive authentication method based on the orientation sensor for smartphone users" by C.-C. Lin, D. Liang, C.-C. Chang, and C.-H. Yang in Software Security and Reliability (SERE), 2012 IEEE Sixth International Conference on, pages 245-252. IEEE 2012 takes a similar approach. However, the system focuses exclusively on the orientation of the device as the user performs a touch screen gesture, the hypothesis being that users hold their devices in a unique way. The training set for each user contains 450 samples, which is not conducive to fast learning. Since the system is not tested against imitation attacks by impostors, it is unclear whether such a system is resistant to mimicry attacks. However, the system does train only on a single class of user data, and authentication does occur transparently to the user.

The system described in "Silentsense: silent user identification via touch and movement behavioral biometrics" C. Bo, L. Zhang, X.-Y. Li, Q. Huang, and Y. Wang in Proceedings of the 19th annual international conference on Mobile computing & networking, pages 187-190. ACM, 2013 combines both touch behavior and small movements in the accelerometer and gyroscope over the course of a touch gesture to try and identify when a guest is using the device, which is not intrusive for the user. The system observes sequences of gestures to determine whether a new user is using the device. The system uses both one class and multi class learning, partially fulfilling the first requirement. However, monitoring occurs continuously during the operation of applications, which may not be a stable observable. Again, the use of multi-class learning impacts the ability of the algorithm to efficiently learn. The evaluation does include attackers or impostors using a legitimate user's device, however these are not explicitly imitation attempts—rather they are random attackers/impostors who do not have knowledge of the user's behavior. Therefore, it is unclear whether such a system is resistant to mimicry attacks.

The system described in "Touchalytics: On the applicability of touchscreen input as a behavioral biometric for continuous authentication" by Frank et al, IEEE Transactions on Information Forensics and Security, vol. 8, no. 1, pp. 136-148, 2013 considers the characteristics of the touch gesture itself, extracting and analyzing features such as the velocity, starting and ending locations, and direction. The system uses authentication after observation of a single swipe, as well as after observation of a sequence of swipes. The work employs classification techniques which do not train solely on user data and which impact learning efficiency. Again, observation is continuous, and so may not be stable.

BRIEF SUMMARY

In accordance with one embodiment, a system is provided for implicit authentication for a mobile device associated with a user, wherein the implicit authentication is behavioral, biometric and task-based and includes at least one authentication task selected so as to leverage the user's muscle memory. The mobile device comprises a touchscreen; a transaction authentication information unit; one or more sensors coupled to the transaction authentication information unit; and an anomaly detector coupled to the transaction authentication information unit. The sensors comprise (1) one or more touchscreen sensors coupled to the touchscreen, (2) an accelerometer, and (3) a gyroscope, and are used to obtain and transmit one or more sets of data to the transaction authentication information unit, the one or more sets of data being associated with one or more performances of the at least one authentication task by the user. The anomaly detector generates an authentication model using the one or more data sets transmitted to the transaction authentication information unit, the generating comprising constructing a set of features for a user profile associated with the one or more performances of the at least one authentication task, and one or more parameters associated with the set of features. The anomaly detector also performs training using the one or more data sets transmitted to the transaction authentication information unit, the training comprising learning so as to adjust the one or more parameters associated with the set of features, the learning being performed using one or more learning algorithms, and storing the user profile associated with the adjusted one or more parameters in the database. The anomaly detector also authenticates the user using the one or more data sets transmitted to the transaction authentication information unit, wherein the anomaly detector analyzes at least one of the one or more data sets corresponding to at least one of the one or more performances of the at least one authentication task using one or more anomaly detection algorithms together with the stored user profile. Based on the analyzing, the anomaly detector decides whether the authentication is successful or unsuccessful.

In accordance with another embodiment, a method is provided for implicit authentication for a mobile device associated with a user, wherein the implicit authentication is behavioral, biometric and task-based. The task-based behavioral biometric implicit authentication comprises at least one authentication task, and the authentication task is chosen so as to leverage the user's muscle memory. The mobile device comprises a touchscreen; a transaction authentication information unit; one or more sensors coupled to the transaction authentication information unit and comprising (1) one or more touchscreen sensors coupled to said touchscreen, (2) an accelerometer, and (3) a gyroscope; and an anomaly detector coupled to the transaction authentication information unit. The method comprises obtaining, by the one or more sensors, one or more sets of data associated with one or more performances of the at least one authentication task by the user; transmitting, by the one or more sensors, the obtained one or more sets of data to the transaction authentication information unit; generating, using the anomaly detector, an authentication model using the transmitted one or more data sets; and training the anomaly detector using the one or more data sets transmitted to the transaction authentication information unit. The generating includes constructing a set of features for a user profile associated with the one or more performances of the at least one authentication task, and one or more parameters associated with said set of features. The training includes learning so as to adjust the one or more parameters associated with the set of features, the learning performed using one or more learning algorithms, and storing the user profile associated with the adjusted one or more parameters in the database.

The anomaly detector authenticates the user using the one or more data sets transmitted to the transaction authentication information unit, by analyzing, by the anomaly detector, at least one of the one or more data sets using one or more anomaly detection algorithms together with the stored user profile; and deciding whether the authentication is successful or unsuccessful based on said analyzing.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

DETAILED DESCRIPTION

Figure 1:
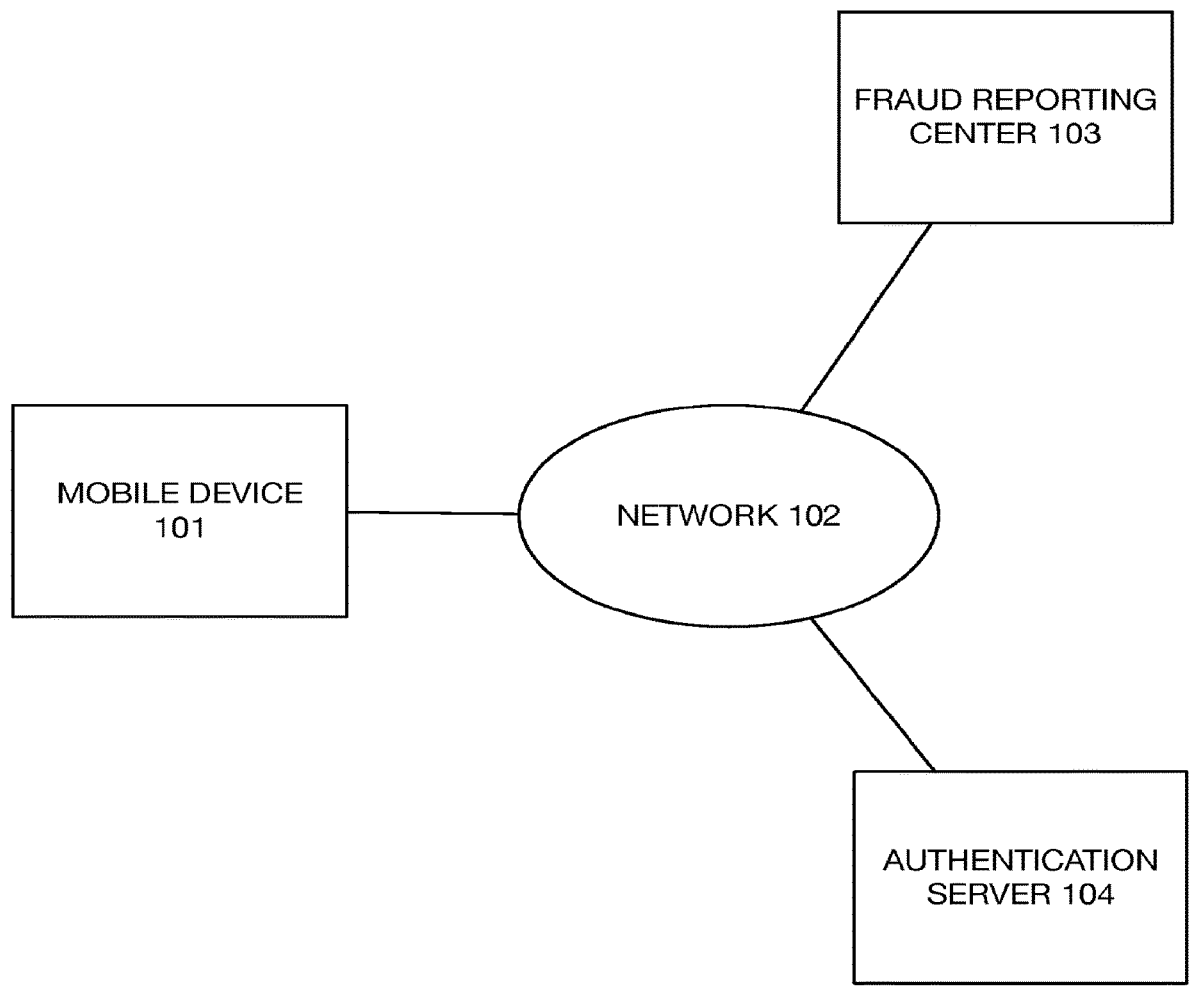
FIG. 1 is a block diagram of a typical configuration of an authentication system for a mobile device.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

While the below description is written for mobile devices, it would be apparent to one having skill in the art that the embodiments described below could equally be applied to other user devices such as fixed or stationary devices and terminals as well.

Approach

A decision as to whether to use a continuous, secondary, or task-based biometric as an implicit behavioral biometric must be made. Secondary biometrics require an intrusive, primary authentication action, thus they are not a good candidate for implicit authentication. As seen in the previous section, continuous behavioral biometrics suffer from two issues. First, given the nature of continuous monitoring, one must deal with a large, dynamic state space produced by the output of multiple sensors. This results in a highly complex, multi-modal data landscape that is very challenging to model as it changes with context. For example, if the user starts playing a game on their phone, then the data obtained may be very different from the case where the user is answering emails.

Therefore a task-based behavioral biometric implicit authentication scheme best meets the requirements set out previously. Task-based behavioral biometric implicit authentication schemes leverage the muscle memory users build up doing a common task. The more habitual the task, the more likely it will be to characterize normal behavior, and consequently, the easier it will be to detect anomalies. Also, it makes it harder to imitate thus making it more resistant to mimicry attacks.

A natural candidate task for a task-based behavioral biometric on a smartphone is by modeling standard user interactions with the device. Smartphone interfaces since the iPhone® are designed around a variety of multi-touch gestures such as taps, pinches, and swipes. Most of these interactions involve on-screen widgets that present one or more specific touch targets to the user, such as buttons, sliders, scrollable lists, and so on.

One would expect significant variability in how the widget is used based upon its context in the application. Factors such as where a button is placed, or the number of items in a scrollable list, could affect the pattern of how a user interacts with a widget. To maximize the likelihood of uniform interface interactions, a task that minimizes these variations must be chosen.

One possibility would be to authenticate users based on their typing patterns on an on-screen keyboard such as described in "Authenticating mobile phone users using keystroke analysis" by N. L. Clarke and S. Fumell in International Journal of Information Security, 6(1):1-14, 2007. However, typing is not an appropriate task to consider for task-based authentication on a smartphone. This is because typing is so arduous that the entire interface of the device is designed to minimize the use of an on-screen keyboard; furthermore, significant variations in typing behavior are expected depending upon what is being typed, and for what purpose. Thus, in order to get better performance and usability characteristics, an action that is more common than typing on smartphones, and also displays high levels of regularity is required.

One such habitual task which is used is one or more swipes or swipe gestures. A swipe is the horizontal sliding away of a screen. Whether slid to the left or to the right, such screen transitions are common: they are used to present cover screens (as with the iOS lock screen) and to present multiple information screens. In some embodiments, the permissibility of a swipe gesture is made clear through visual cues or explicit visual indicators such as dots at the bottom of a screen, where each dot indicates a screen that can be viewed. In other embodiments, swipes have no explicit visual indicator. An example of this is a Really Simple Syndication (RSS) reader where swipes transition between items.

Because of the common usage of swipes, users readily develop subconscious muscle memory. For example, readers can swipe without knowing when reading an electronic book. Furthermore, users tend to perform swipes in a user-specific way. This makes it harder to imitate the performance of these tasks thus making such a system more resistant to mimicry attacks. Swipes also have the advantage of offering no specific touch targets. Generally, swipes offer flexibility to users as well, as many different kinds of swipes all produce the same results. Therefore, swipes are good candidate tasks for task-based behavioral biometric implicit authentication on a mobile device.

Figure 2:
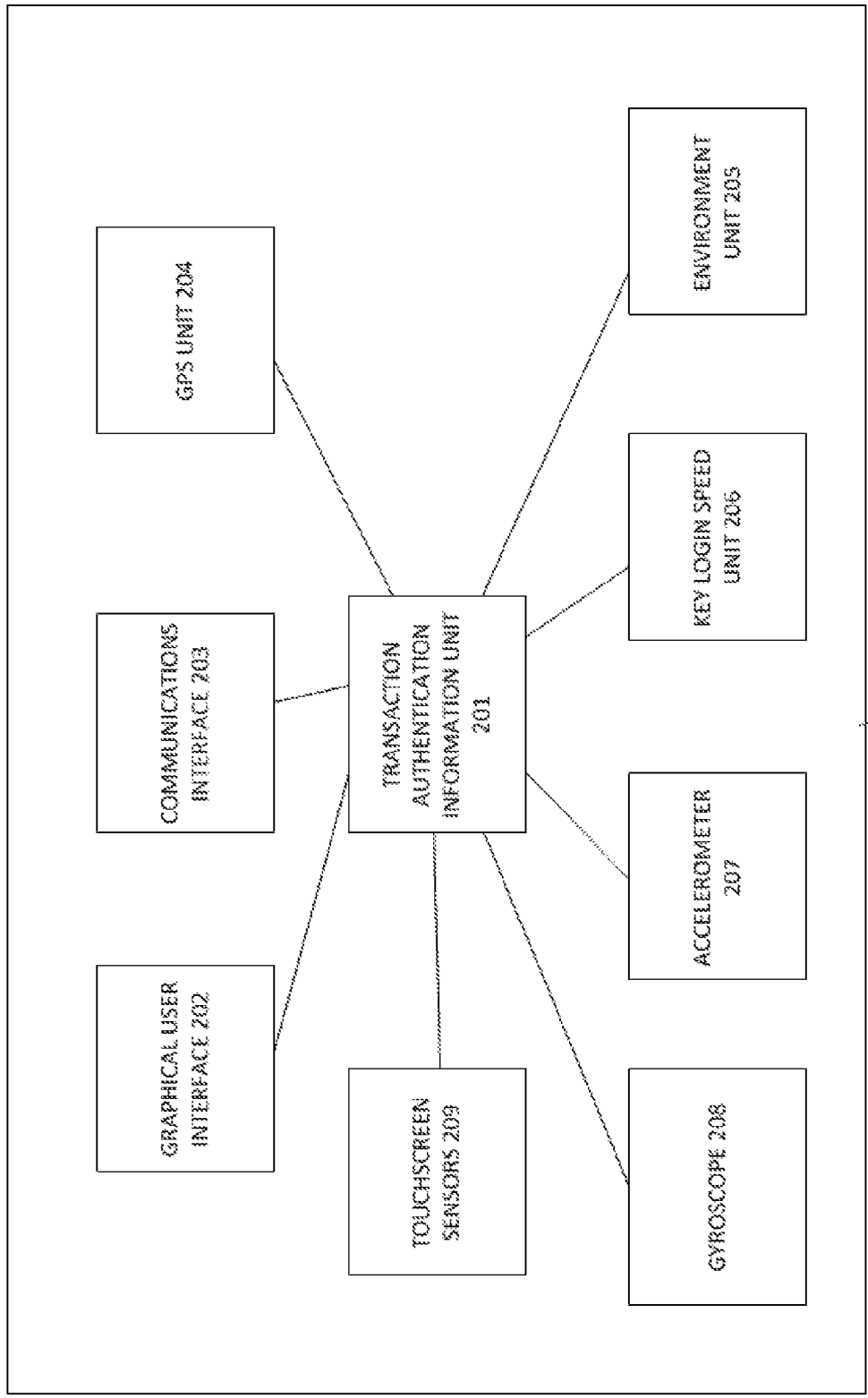
FIG. 2 is a block diagram of a mobile device having a task-based behavioral biometric implicit authentication system.
Figure 3:
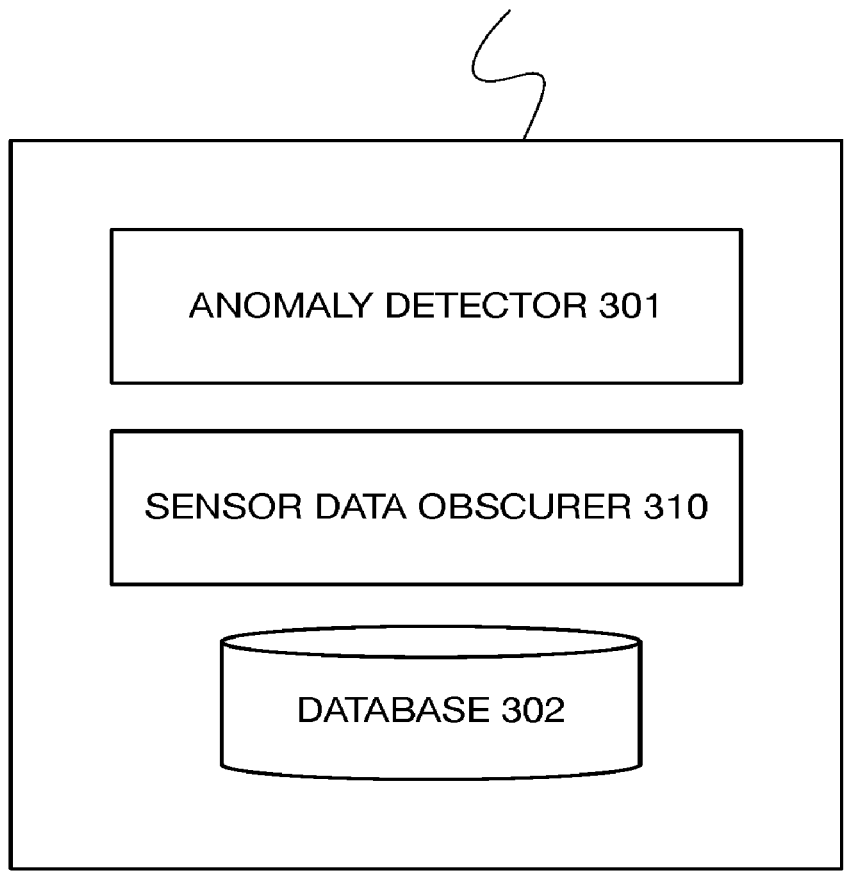
FIG. 3 is a block diagram of a transaction authentication information unit.
Figure 4:
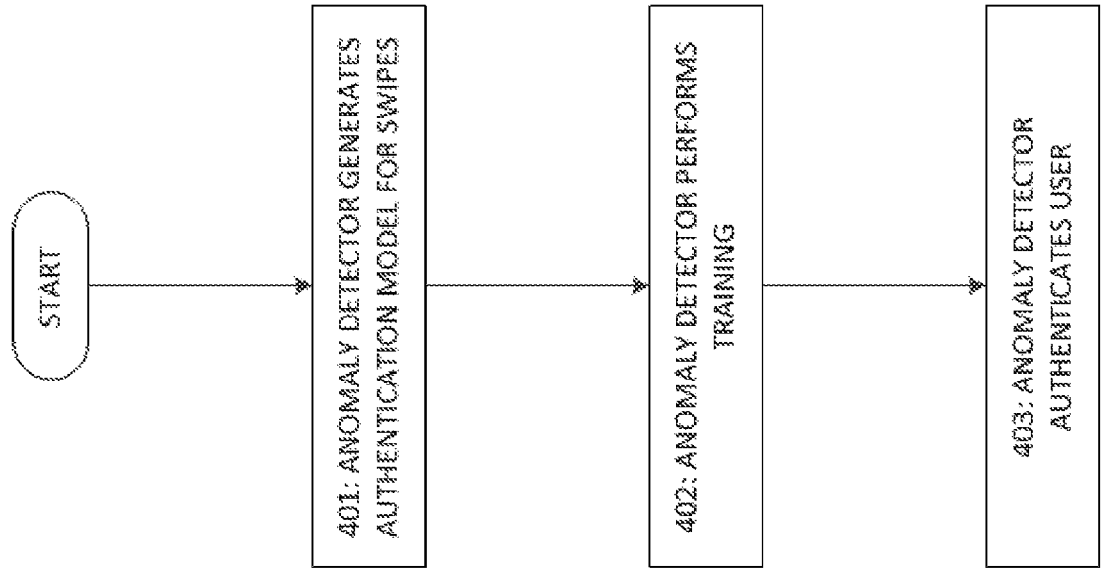
FIG. 4 is a flowchart for a task-based implicit authentication system that uses swipes.

FIGS. 2-4 illustrate an embodiment of a task-based behavioral biometric implicit authentication system using swipes.

FIG. 2 shows a detailed embodiment of the mobile device 101 of FIG. 1 having a transaction authentication information unit 201 coupled to a graphical user interface 202, a communication interface 203, a Global Positioning System unit 204, an environment unit 205, a key login speed unit 206, an accelerometer 207, a gyroscope 208, and one or more touchscreen sensors 209 coupled to a touchscreen on a mobile device.

The graphical user interface 202 provides the user with the ability to enter and view information and includes a keyboard and display for example. The communications interface 203 allows the mobile device to communicate with other devices and servers in a network communications system.

Components 204-209 are one or more sensors which provide data to the transaction authentication information unit 201. The GPS unit 204 provides position and velocity information. The environment unit 205 provides information on environmental conditions such as temperature, humidity and wind speed. The key login speed unit 206 monitors the speed at which login information is keyed in. The accelerometer 207 and gyroscope 208 provide information such as orientation of the mobile device, velocity of the mobile device and acceleration of the mobile device, which can then be used to calculate, for example, distance travelled by the mobile device and direction taken by the mobile device. It is known to one of skill in the art that these may not be the only sensors coupled to the transaction authentication information unit. For example, in some embodiments, biometric sensors such as heartbeat detectors, fingerprint detectors and body temperature detectors are also connected to the mobile device and transaction authentication information unit 201. Touchscreen sensors 209 are coupled to the touchscreen to capture data from user interaction with the touchscreen. Examples of touchscreen sensors include pressure sensors to detect force on the touch screen of a smartphone or tablet. An example of such a sensor is described in, for example, "Apple Patents IR Tech for Detecting the Force of Touch Input On iPads and iPhones". The sensor and technology underlying the sensor is further described in detail in US Patent Application 2014/0092052 to Grunthaner et al herein incorporated by reference as if reproduced in its entirety. In a further embodiment, the sensors are built into the touchscreen.

The transaction authentication information unit 201 communicates with the various components and sensors 202-209 to receive data on the mobile device and to perform authentication. For example, the transaction authentication information unit 201 communicates with the GPS unit 204 to receive position and velocity information for the mobile device. The environment unit 205 communicates with transaction authentication information unit 201 to receive information on environmental conditions at the location of the mobile device. In addition, the transaction authentication information unit 201 communicates with the key login speed unit 206 to receive information on key logins. The transaction authentication information unit 201 communicates with the accelerometer 207 and the gyroscope 208 to receive information to, for example, determine velocity and acceleration of the user/device. This can be used to, for example, determine gait of the user. The transaction authentication information unit 201 communicates with the GUI 202 to provide a GUI for displaying information relevant to the authentication process and for user input of information required for input by the user.

The transaction authentication information unit 201 is implemented using, for example, hardware, software, or a combination of hardware and software. FIG. 3 illustrates an embodiment of the transaction authentication information unit 201 that includes an anomaly detector 301 that operates and configures one or more anomaly detection algorithms. Anomaly detector 301 also builds and configures one or more user models. The anomaly detection algorithms together with the user models or user profiles are utilized by the anomaly detector 301 to authenticate the user. The user models or user profiles are stored within transaction authentication information unit 201 in database 302. Each of anomaly detector 301 and database 302 are implemented using, for example, hardware, software or a combination of hardware and software.

FIG. 4 is a flowchart for a task-based implicit authentication system that uses swipes. In step 401, in one embodiment, an authentication model for swipes is generated using data from one or more sensors. In an embodiment, to generate an authentication model for swipes, data from the accelerometer 207, the gyroscope 208, and the touch screen sensors 209 are obtained and sent to transaction authentication information unit 201. The first two sensors return three distinct time series, one for each axis. These time series represent the motion of the mobile device in 3-dimensional space while the swipe is being performed across the touchscreen. The touch screen sensors return two time series representing the x- and y-coordinates of points on the swipe. The pattern of each of these time series is likely to be unique among users. In one embodiment, in step 401 the accelerometer, gyroscope and touchscreen sensor time series data for each swipe is discretized by the anomaly detector 301 by binning and calculating the area and slope of the data in each bin, after the data is obtained from these one or more sensors.

These time series data is then used by the anomaly detector 301 running on transaction authentication information unit 201 to construct a set of features with associated model parameters to be stored in the user profile in order to represent a swipe. This further increases the strength of the authentication system because: Unlike fingerprints, for example, only a feature representation of the swipe is stored in the user profile and not the entirety of the swipe data. This makes it more difficult for an impostor to re-engineer this set of features with associated model parameters to recreate the original swipe and hence defeat the system.

In one embodiment, the set of features associated with a swipe are represented by one or more of:
(1) start and end co-ordinates,
(2) swipe direction,
(3) duration of the swipe,
(4) length of the swipe,
(5) the peak length and duration.
The pattern of each of these time series is likely to be unique among users. Then, the swipes are thus represented by a feature vector consisting of these values.

In one embodiment, in step 402 the anomaly detector 301 performs training, that is the anomaly detector 301 learns how the user performs the task so as to distinguish between the user and an impostor, and consequently improve resistance to mimicry attacks. In one embodiment, the learning is performed based on the data received from the one or more sensors. Then, learning is performed using the time series data. In another embodiment, the discretizing process previously described is performed using the time series data received from the one or more sensors. Then, learning is performed using the discretized time series data. In an embodiment, the anomaly detector 301 performs the learning so as to adjust the model parameters associated with the set of features described above. In one embodiment, one or more learning algorithms are used to adjust the model parameters.

The amount of data required to train the detector 301 is an important parameter. Making the user swipe a large number of times to train the detector will greatly reduce its convenience factor. In one embodiment, a number of swipes are used as the initial training window and authentication is begun after the last swipe. In a further embodiment, in order to ensure that the system is up-to-date with the user's swipe patterns, a rolling window approach to training is employed, in which the latest authenticated swipe is added to the training window, and the earliest swipe is removed. Then training is performed using the data sets corresponding to the remaining swipes within the training window.

As explained previously, a feature vector is used to represent the swipes. An exemplar feature vector is generated from all the swipes in the training window by the anomaly detector 301 by calculating the average of the feature vector values. In one embodiment, the mean and standard deviation of the distances of the feature vectors corresponding to the swipes in the training window from the exemplars are calculated.

In a further embodiment, the user's behavior is modelled using their global maximum and minimum values in each axis for each sensor. For a given axis i, the maximum and minimum values are obtained by calculating the mean, psi and standard deviation, osi of sensor s. The maximum and minimum are then calculated as:

$$\max si = psi + kosi$$

$$\min si = psi - kosi$$

where k is a threshold. In yet another embodiment, k is a user specified parameter.

In a further embodiment, in step 402, in one embodiment, the one or more learning algorithms comprise comparing the user's performance of the task with impostor or attacker attempts to imitate the user's performance of the task. In a further embodiment, a plurality of attacker/impostor models, each having one or more corresponding characteristics, is created and stored in, for example, database 302 of transaction authentication information unit 201 to enable the comparison. Examples of such attacker/impostor models have been developed in the context of email system authentication in Li, Yiru el al "Securing email archives through user modeling." Computer Security Applications Conference, 21st Annual. IEEE, 2005; and Li, Yiru. "Toward Email Archive Intrusion Detection." Master of Computer Science dissertation, Carleton University, 2005; both herein incorporated by reference as if reproduced in their entirety. In a further embodiment, at least one of these models are then used to set the thresholds mentioned above, and make sure that the thresholds for a user are not so large as to allow malicious attacks. In a further embodiment, at least one of the attacker models are based upon empirically-derived observations of the ability of one or more people other than the user to imitate the user's actions. In another embodiment, at least one of the models are based on one or more estimates of the capabilities of hypothetical impostors. These estimates can be obtained via, for example, simulations.

The transaction authentication information unit also incorporates sensor data obscurer 310, which is responsible for encryption of the sensor data, such that the resulting cyphertext cannot be used in playback attacks, conducted by a remote attacker having penetrated a mobile device incorporating the transaction authentication information unit, without detection by the anomaly detection, nor can the cleartext version be discovered by a remote attacker, and then used in a playback attack. Methods of ensuring that the remote attacker cannot use the captured cyphertext in a cost-effective manner, nor recover the plaintext from the cyphertext, in order to conduct playback attacks, are known to those with skill in the art.

The user profile with the adjusted parameters is stored in database 302 of the transaction authentication information unit 201. By using known data from the user to build a model that best captures the intricacies of that data in step 402, this satisfies the requirement of learning using user data. It is important that the model parameters are not too tight or specific, as that will not allow the user to be authenticated; or too loose or general, as that will allow attackers to be authenticated.

In step 403, the user is prompted to perform the task and is authenticated based on the performance of the task. In step 403, anomaly detector 301 utilizes one or more anomaly detection algorithms together with the stored user profile created in step 402 to authenticate the user. Specifically, the anomaly detector analyzes the data received from the one or more sensors associated with the performance of the task, and compares the analyzed data to the stored user profile using the anomaly detection algorithms. Based on this analysis, the anomaly detector makes an authentication decision, that is, the anomaly detector indicates whether the authentication is successful or unsuccessful.

For example, in the embodiment where mean and standard deviation are used, swipes are authenticated if their distance from the exemplar is within a threshold number of standard deviations of the mean. In one embodiment, the threshold number is a user specified parameter.

In the embodiment where the user's behavior is modelled using their global maximum and minimum values in each axis for each sensor: If the swipe falls within said [minsi, maxsi] range, the user is authenticated.

In a further embodiment, the anomaly detector 301 produces a boolean output based on the authentication analysis, that is either a TRUE or a FALSE is produced, corresponding to whether the authentication is successful or unsuccessful. In another embodiment, the anomaly detector produces a score indicating the likelihood that the person performing the task for authentication is the user and not an impostor based on the result of the authentication. If the score is above a threshold then the anomaly detector indicates the authentication is successful. If the score is below a threshold, then the anomaly detector indicates that the authentication is unsuccessful.

In one embodiment, the task to be used for authentication is combined with one or more non-authentication tasks which do not form part of the authentication. For example, as part of the authentication mechanism, the user may be asked to read a plurality of pages of text, zoom in on specific parts of each page, and transition between pages by swiping. However, steps 402 and 403 are performed only for the swipes. This way, the user does not realize which tasks are being used for authentication purposes. Such an arrangement improves security, because if a user does not realize which tasks are being used for authentication purposes, the likelihood of an impostor knowing which tasks are being used for authentication is reduced.

In another embodiment, a combination of different tasks is used for authentication. For example, in one embodiment, the combination comprises two tasks. The first task is performing one or more swipes. A second task is performing one or more zoom gestures. Then, in one embodiment, steps 401-403 are performed for each of the tasks within the combination of tasks.

While the above describe embodiments where authentication is implemented within the mobile device, other embodiments are also possible. In another embodiment, authentication is implemented using a cloud-based service. An example of such an implementation is explained below with reference to the components of FIGS. 1 and 2. Mobile device 101 runs an application or an "app." As part of the operation of the app, the transaction authentication information unit 201 receives data from one or more sensors such as sensors 204-209 of the mobile device, and forwards the information obtained from the one or more sensors to, for example, fraud reporting center 103 or authentication server 104 over network 102. Instead of running on transaction authentication information unit 201, the anomaly detector runs at the fraud reporting center or the authentication server to perform steps 401-403 of FIG. 4. The anomaly detector takes the data transmitted from the transaction authentication information unit 201 as an input and uses one or more anomaly detection algorithms together with a user profile to authenticate the user. The user profile is stored within a database located at the fraud reporting center 103 or within the authentication server 104.

In another embodiment, the anomaly detector is implemented in a distributed fashion over the mobile device 101 and the fraud reporting center 103 or authentication server 104. The user profile is stored within a database located within the mobile device 101, or at the fraud reporting center 103, or within the authentication server 104. Then, the anomaly detector to perform steps 401-403 of FIG. 4, that is, it retrieves the user profile, and uses one or more anomaly detection algorithms together with the user profile to authenticate the user.

In one embodiment, if the authentication in step 403 fails due to the detection of anomalous performance by the anomaly detector, then the anomalous performance is reported to, for example, the authentication server 104 or the fraud reporting center 103 over network 102. Data associated with the anomalous performance such as the nature of the anomaly, time, and other information about the state of the device such as the application that was running and the device's location is stored in, for example, a database located in the fraud reporting center 103 or authentication server 104.

While the above describes embodiments which use data generated by accelerometer 207, gyroscope 208 and touchscreen sensors 209, it would be known to one of skill in the art that data from any of the sensors 204-209 can be used.

In another embodiment, the data obtained from the one or more sensors can be combined with contextual data to perform steps 401-403. Contextual data refers to data associated with the context of the user. Examples of contextual data include:

the location of the user,
 the weather at the location of the user,
 the time of day,
 whether the user is standing, sitting, running, walking or sleeping, or
 whether the user is within a moving vehicle.

Contextual data can be obtained from a variety of sources, including, for example, the one or more sensors connected to the mobile device 101, the fraud reporting center 103 and the authentication server 104. In one embodiment, steps 402 and 403 are adjusted based on the contextual data obtained. For example, if a user has been running, it is likely that the swipes performed by the user will be different to the swipes performed by the user when the user is sitting down. Then the anomaly detector configures steps 402 and 403 so that it is able to learn and distinguish between the swipe performances for these different situations.

In another embodiment, contextual data can be used to assign a trust level for use in step 403. For example, in one embodiment, a trust level is assigned based on user location, that is, when the user is in a high trust location such as a home, a high trust level is assigned. When the user is in a public location, lower trust levels may be assigned based on the location. For example, if the user is in a location which is known to have many potential impostors, a lower trust level is assigned. Then, for example, step 403 includes performing additional tasks for authentication which the user does not realize are being used for authentication. The assigning is performed by, for example, the anomaly detector or transaction authentication information unit 201.

In yet another embodiment crowdsourced data is used, either solely or in combination with the contextual data, to assign the trust level. Crowdsourced data is obtained from a variety of sources, for example, social media sites, microblog sites and input from one or more users. For example, based on information scoured from one or more social media sites or specifically peer-to-peer interactions on the one or more social media sites, the anomaly detector or transaction authentication information unit 201 assigns different levels of trust to different locations.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A computer-implemented method comprising:
   obtaining sensor data, the sensor data being recorded by a mobile device while a user of the mobile device performs a selected task, the sensor data representing a motion of the mobile device in three-dimensional space while the selected task is performed;
   determining a feature representation of the selected task performed by the user of the mobile device, the feature representation being based on the obtained sensor data that represents the motion of the mobile device in three-dimensional space while the selected task is performed;
   analyzing the feature representation against a user model that is generated by one or more instances in which an authenticated user performed the selected task;
   determining, based on analyzing the feature representation, a likelihood that the user of the mobile device is the authenticated user; and
   authenticating the user of the mobile device based on the likelihood.

2. The method of claim 1, further comprising:
   determining a context of the user of the mobile device, and wherein analyzing the feature representation against the user model is adjusted for the determined context of the user.

3. The method of claim 2, wherein determining the context is based at least in part on an environment of the mobile device.

4. The method of claim 2, wherein determining the context is based at least in part on a location of the mobile device.

5. The method of claim 2, further comprising determining a trust level for a transaction based on the context.

6. The method of claim 1, wherein the sensor data is generated by one or more sensors built into a touchscreen of the mobile device.

7. The method of claim 5, wherein the trust level is assigned based on crowdsourced data.

8. The method of claim 1, wherein the user of the mobile device performs the selected task by swiping a touchscreen of the mobile device.

9. The method of claim 8, wherein the feature representation includes a force applied by the user of the mobile device when swiping the touchscreen.

10. The method of claim 1, wherein the user of the mobile device is authenticated for a transaction.

11. The method of claim 1, wherein the method is performed on the mobile device.

12. The method of claim 1, wherein the method is performed on one or more servers that communicate with the mobile device to obtain the sensor data.

13. The method of claim 1, wherein determining the feature representation is performed by the mobile device, and wherein the method further comprises:

transmitting, from the mobile device, the feature representation to one or more servers; and
wherein analyzing the feature representation is performed by the one or more servers.

14. A computer system comprising:
one or more processors;
memory storing instructions;
wherein the one or more processors execute the instructions to perform operations comprising:
  obtaining sensor data from a plurality of sensors of different types that are incorporated within a mobile device, the sensor data being recorded by the mobile device while a user of the mobile device performs a selected task, the sensor data representing a motion of the mobile device in three-dimensional space while the selected task is performed;
  determining a feature representation of the selected task performed by the user of the mobile device, the feature representation being based on the obtained sensor data that represents the motion of the mobile device in three-dimensional space while the selected task is performed;
  analyzing the feature representation against a user model that is generated by one or more instances in which an authenticated user performed the selected task;
  determining, based on analyzing the feature representation, a likelihood that the user of the mobile device is the authenticated user; and
  authenticating the user of the mobile device based on the likelihood.

15. The computer system of claim 14, wherein the operations further comprise:
  determining a context of the user of the mobile device, and
  wherein analyzing the feature representation against the user model is adjusted for the determined context of the user.

16. The computer system of claim 14, wherein the user of the mobile device performs the selected task by swiping a touchscreen of the mobile device.

17. The computer system of claim 16, wherein the feature representation includes a force applied by the user of the mobile device when swiping the touchscreen.

18. The computer system of claim 14, wherein the user of the mobile device is authenticated for a transaction.

19. The computer system of claim 14, wherein the computer system includes the mobile device.

20. A non-transitory computer readable medium that stores instructions, that when executed by one or more processors of a computer system, cause the computer system to perform operations that include:
  obtaining sensor data from a plurality of sensors of different types that are incorporated within a mobile device, the sensor data being recorded by the mobile device while a user of the mobile device performs a selected task, the sensor data representing a motion of the mobile device in three-dimensional space while the selected task is performed;
  determining a feature representation of the selected task performed by the user of the mobile device, the feature representation being based on the obtained sensor data that represents the motion of the mobile device in three-dimensional space while the selected task is performed;
  analyzing the feature representation against a user model that is generated by one or more instances in which an authenticated user performed the selected task;
  determining, based on analyzing the feature representation, a likelihood that the user of the mobile device is the authenticated user; and
  authenticating the user of the mobile device based on the likelihood.

21. The non-transitory computer readable medium of claim 20, wherein the operations further comprise:
  determining a context of the user of the mobile device, and
  wherein analyzing the feature representation against the user model is adjusted for the determined context of the user.

22. The non-transitory computer readable medium of claim 21, wherein the user of the mobile device performs the selected task by swiping a touchscreen of the mobile device.

23. The non-transitory computer readable medium of claim 22, wherein the user of the mobile device is authenticated for a transaction.

24. A computer system comprising:
  an anomaly detection module configured to analyze a feature representation of sensor data of different types recorded on a mobile device in connection with a user performing a task on the mobile device, the sensor data representing a motion of the mobile device in three-dimensional space while the task is performed on the mobile device;
  wherein the anomaly detection module analyzes the feature representation against a user model that is generated by one or more instances in which an authenticated user of the mobile device performed the task; the anomaly detection module determining, based on analyzing the feature representation, a likelihood that the user of the mobile device is the authenticated user; and
  a transaction authentication module configured to communicate with the anomaly detection module to authenticate the user of the mobile device based on the likelihood.

25. The computer system of claim 24, wherein the anomaly detection module is distributed between the mobile device and one or more servers.

26. The computer system of claim 24, wherein the anomaly detection module is implemented on a mobile device, and the transaction authentication module is implemented by one or more servers.

27. The computer system of claim 24, wherein the transaction authentication module authenticates the user for a transaction.

28. The computer system of claim 24, wherein the task performed by the user includes a swipe on a touchscreen of the mobile device.

* * * * *